United States Patent [19]

Chalmers et al.

[11] Patent Number: 5,408,214

[45] Date of Patent: Apr. 18, 1995

[54] VEHICLE IMPACT SENSOR

[76] Inventors: George R. Chalmers; Joan A. Chalmers, both of 6 Staffordshire Commons, Wallingford, Conn. 06492

[21] Appl. No.: 876,498

[22] Filed: Apr. 30, 1992

[51] Int. Cl.$^6$ .............................................. B60Q 1/00
[52] U.S. Cl. ..................... 340/436; 180/274; 200/61.44; 200/82 D
[58] Field of Search ..................... 340/436, 431, 932.2, 340/958, 435, 463, 901, 933; 180/271, 274, 277, 279; 200/61.44, 61.45 M, 61.53, 82 R, 82 D, 241

[56] References Cited

U.S. PATENT DOCUMENTS

| | | | |
|---|---|---|---|
| 2,444,635 | 7/1948 | Dennis, Jr. | 340/436 |
| 3,793,498 | 2/1974 | Matsui et al. | 200/61.53 |
| 3,853,199 | 12/1974 | Hirashima et al. | 200/61.44 |
| 3,901,346 | 8/1975 | Kohls et al. | 180/277 |
| 3,999,431 | 12/1976 | Makarainen | 200/82 D |
| 5,045,834 | 9/1991 | Hutchcraft | 340/436 |

*Primary Examiner*—Brent Swarthout
*Attorney, Agent, or Firm*—John J. Daniels

[57] ABSTRACT

An impact sensor for a motor vehicle has a plurality of sensing members disposed on a motor vehicle which are effective for sensing an impact with an obstacle and generating a signal in response thereto. The sensing members include a respective telescoping support member which is fixedly supportable by the motor vehicle and has a first telescope member and a second telescope member. The first telescope member is dimensioned and configured to slideably move relative to the second telescope member in a telescoping manner. A rigid member, which is supported by each of the telescoping support members, and which extends therefore from the vehicle, is effective for transferring a force of impact occurring between the rigid member and an obstacle to at least one of the sensing members. Thus, when an obstacle contacts with the rigid member, the rigid member deflects causing the telescoping support member of at least one of the sensing members to compress in response to the force of impact. This compression of the telescoping support member is detected and a signal is generated which is effective for generating an alarm (preferably either audio or visual) which is perceived by the driver indicating that an impact has occurred.

15 Claims, 8 Drawing Sheets

VEHICLE IMPACT SENSOR

BACKGROUND OF THE INVENTION

The present invention pertains to a vehicle impact sensor. More particularly, the present invention pertains to an impact sensor adaptable for use with a vehicle to detect impact with an obstacle during backing up of the vehicle before damage occurs.

Ever since vehicles have been equipped with means for driving in reverse, there has been an ever-present source of damage or injury when backing up the vehicle. This is due to the fact that vehicles are designed primarily to be driven forward. Thus, the driver has very limited vision of obstacles present when backing up and, in addition, control of the vehicle during backing up is severely limited. In an attempt to alleviate the difficulties of backing up a vehicle, mirrors, such as side view mirrors and rear view mirrors, have been incorporated into the design of vehicles to facilitate the driver's visual perception of obstacles behind the vehicle during backup. However, the use of such mirrors is extremely inadequate because oftentimes the obstacle simply is not in the optical line of sight of the mirrors. Many factors contribute to the limitation of the use of mirrors for visual perception of rearward obstacles. For example, many times such obstacles are below the trunk line of the car and thus the trunk blocks the obstacle from view. Furthermore, the practical design of many vehicles inherently limits any view of such rearward obstacles from the driver even if mirrors are used.

In particular, the practical design of trucks requires a relatively long cargo area positioned behind the driver and usually consists of an opaque steel box-like structure or an opaque tank. Further, recreational vehicles, such as mobile homes and the like, are configured such that it is extremely difficult for the driver to see obstacles when backing up. Also, drivers of recreational vehicles are often inexperienced with regards to driving a large long vehicle. Obviously, it is therefore impossible for the driver of such trucks and recreational vehicles to adequately perceive rearward obstacles when backing up even if multiple mirrors are used.

Thus, truck drivers have great difficulty when backing up their vehicles and often back over or into obstacles behind the truck causing great damage to the obstacle, such as a car or building, and to the truck. Furthermore, because of the relatively great distance between the rear of the truck and the driver, as well as the particularly, noisy environment caused by the truck's diesel engine, the driver often cannot know that he has made contact with a rearward obstacle and will continue backing up even after hitting such an obstacle causing further damage. In addition, trucks are usually equipped with very powerful engines, required due to the great weight of the truck and the anticipated weight of its payload. Therefore, when backing up the driver of the truck will usually not notice the slight hesitation of the momentum of the backing up truck when an obstacle is encountered. Usually, when such contact is made, the driver does not "feel," hear, or see that contact has been made with the rearward obstacle until much damage has occurred.

There have been attempts to provide devices for warning a driver of a rearward obstacle during back up. Such devices, typically, attempt to warn the driver before substantial damage occurs due to contact with the obstacle. These devices include closed circuit television monitors in which a television camera is mounted at a suitable location at that back of the vehicle and a monitor is placed where the driver can view the scene behind the vehicle when backing up. Such a device is very cost prohibitive and it is extremely difficult for the driver to control his vehicle when backing up and looking at the monitor. Another example of such a warning device is a radar or infrared system in which a radar or infrared unit is disposed at the rear of the vehicle and determines the proximity of rearward obstacles using radar or infrared. When an obstacle is detected that is within a certain "danger zone" during backing up, the driver receives a signal warning him of the existence of the obstacle. However, false signals are apt to occur, especially in parking lots, at red-lights or stop signs due to the proximity of other vehicles. Also, such systems do not warn the driver of obstacles which are not directly behind the vehicle. Further, such systems are also very expensive and require complicated electronic and mechanical components.

There have been attempts to provide devices which sense contact with an obstacle during backing up of a vehicle before substantial damage occurs. U.S. Pat. No. 4,967,180 issued to Wang discloses probes extending from the rear corner of a vehicle at an angle and designed to improve on the infrared system and contact with an unseen obstacle during backing up of the vehicle. This system signals the driver that when contact has been made between the probe and the obstacle before the vehicle actually makes contact and substantial damage occurs. However, such prior attempts utilizing probes are extremely inadequate and prone to many design flaws. For example, usually such probes are placed at strategic locations at the rear of the vehicle where it is anticipated that the probe will contact an obstacle before the vehicle does. However, such probes do not provide any way to protect the entire rear of the vehicle because unless the obstacle happens to hit the probe, before the vehicle, the driver will never receive the intended warning. Also, such probes are unsightly and inconsistent with the external appearance of the vehicle.

SUMMARY OF THE INVENTION

It is an object of the present invention to overcome the drawbacks of the prior attempts. In particular, it is an object of the present invention to provide an impact sensor for a motor vehicle, such as a car, truck or recreational vehicle, which is effective for sensing contact with an obstacle in the path of a vehicle backing up. It is another object of the present invention to provide an impact sensor for a motor vehicle which is capable of sensing contact with an obstacle anywhere along a relatively large sensing zone without being limited to the relatively small sensing zones provided by the sensing probes of the prior art. Still another object of the present invention is to provide an impact sensor for a motor vehicle which is durable, easy to construct, easy to maintain, and reliable. Still another object of the present invention is to provide an impact sensor for a motor vehicle in which the functional utility of the impact sensor does not detract from the external appearance of the vehicle.

In accordance with the present invention, an impact sensor for a motor vehicle is provided which includes at least one sensing member which may be disposed on the motor vehicle. For example, preferably a plurality of sensing members are disposed at spaced apart positions along the rear of the vehicle. The sensing members are effective for sensing an impact with an obstacle and generating a response thereto. Force transferring means is provided which includes a rigid member that is supportable by the sensing members for transferring a force of impact between the rigid member and the obstacle to the sensing members. Alarm-generating means is further provided that is receptive of the signal generated by the sensing member and generates an alarm in response thereto.

In a preferred embodiment, an alarm indicator is placed in proximity with the driver of the vehicle so that the driver can be warned of the impact. The alarm indicator is preferably either an audio alarm such as a bell or buzzer, or a visible alarm such as a light, LED, or the like.

In a preferred embodiment, the sensing members each include a telescoping support member which is fixedly supportable by the motor vehicle. The telescoping member is normally biased in an extended alarm-ready position so that the inventive impact sensor is ready to alarm the driver of an impact at all times. The telescoping support member has a first telescope member and a second telescope member where the first telescope member is dimensioned and configured to slideably move relative to the second telescope member in a telescoping manner in response to the force of impact transferred through the rigid member. A spring is disposed in an interior space defined by the first telescope member and second telescope member and is effective for constantly urging the first telescope member in an outwardly telescoping manner relative to the second telescope member so that the rigid member is always disposed at a position relative to the motor vehicle effect to cause at least one of the telescoping support members to contract to an alarm-generate position upon contact between the obstacle and the rigid support member. The spring also returns the telescoping support member to the extended alarm-ready position when there is no contact with the obstacle. Preferably, each sensing member further includes relative position sensing means for sensing when the first telescope member moves relative to the second telescope member in the telescoping manner. Thus, when an obstacle impacts anywhere along the rigid member, the force of the impact causes the rigid member to deflect and this deflection is transferred to one or more of the sensing members causing the respective first telescope member of the sensing members to move relative to the second telescope member of the sensing members so that the support member contracts from the extended alarm-ready position to the contracted alarm-generate position. This movement is detected and is effective to cause the alarm generating means to generate an alarm.

Preferably, the relative position sensing means of each sensing member includes a first contact which is movable by the first telescope member and a second contact which is fixed to the second telescope member. Thus, when the first telescope member moves relative to the second telescope member in response to the impact transferred to the sensing member through the rigid member, the relative position sensing means senses the impact. The alarm generating means also includes a signal-generating circuit including a first lead electrically connected with the first contact and a second lead electrically connected with the second contact. Thus, when the first telescope member moves relative to the second telescope member in response to an impact, the signal generating circuit is effective to generate the alarm dependent on the relative positions of the first contact and the second contact.

The relative position sensor may comprise a magnetic coupled detector of known design, which includes a first magnet comprising either of the first contact or the second contact and either a second magnet or a metal member comprising the other of the first contact and the second contact. When the first telescope member moves relative to the second telescope member in response to an impact, the change in position of the elements of the magnetic coupled detector is effective to cause the relative position sensing means to sense the impact transferred to the sensing member through the rigid member and generate the signal in response thereto. This signal is received by the alarm generating means which generates the alarm in response to the signal.

The relative position sensing means may alternatively comprise an electrical coupling detector which includes a first electrical coupling comprising the first contact and a second electrical coupling comprising the second contact. In this embodiment, the relative positions of the elements of the electrical coupling detector are dependent on the relative positions of the first telescope member and the second telescope member. Therefore, when the first telescope member moves relative to the second telescope member in response to the impact with an obstacle, the relative position sensing means senses the impact and generates the signal in response thereto.

In another embodiment of the present invention, the first telescope member and the second telescope member define an interior space having a volume. A gas, such as air, is disposed in the interior space whereby when the first telescope member moves relative to the second telescope member in response to an impact, the volume becomes smaller and the pressure of the gas becomes greater. In this case, each sensing member also includes a pressure detector which detects a change in the pressure of the gas and is thus effective for generating the signal when a predetermined change in the pressure of the gas is detected. This signal is received by the alarm generating means which generates an alarm perceived by the driver of the vehicle in response thereto.

In yet another embodiment of the invention, similar to the last described embodiment, a spring is further included which is disposed in the interior space and is effective for urging the first telescope member in an outwardly telescoping manner relative to the second telescope member. Also, this embodiment may include a one-way valve in communication with the interior space which is effective for maintaining the gas at an ambient pressure during a period of no impact.

DETAILED DESCRIPTION OF THE INVENTION

For purposes of promoting an understanding of the principles of the invention, reference will now be made to the embodiments illustrated in the drawings and specific language will be used to describe the same. It will nevertheless be understood that no limitation of the scope of the invention is thereby intended, there being contemplated such alterations and modifications of the illustrated device, and such further applications of the principles of the invention as disclosed herein, as would normally occur to one skilled in the art to which the invention pertains.

Figure 1A:
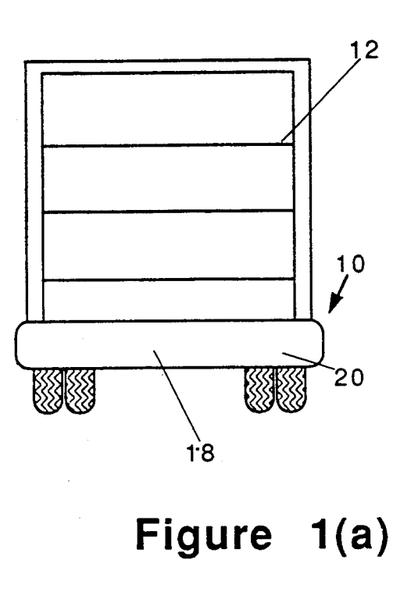
FIG. 1(a) is a rear view of a motor vehicle having a preferred configuration of the inventive impact sensor disposed thereon.
Figure 1B:
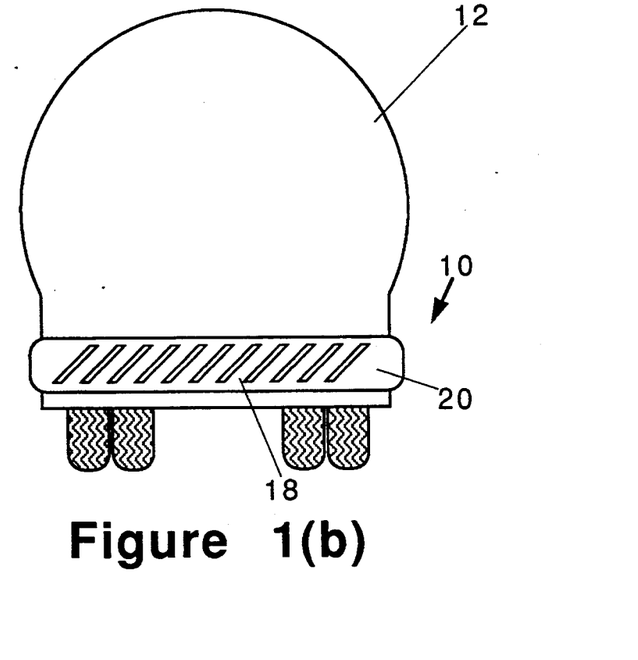
FIG. 1(b) is a rear view of a gas truck having the inventive impact sensor disposed thereon.
Figure 1C:
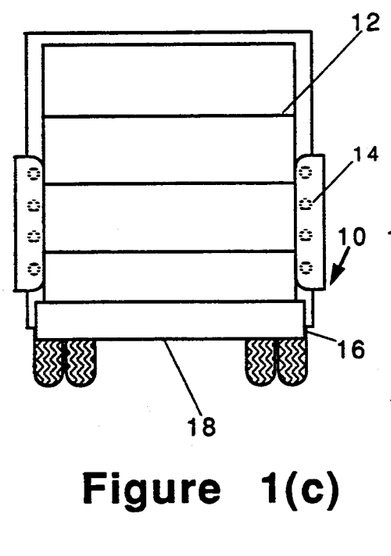
FIG. 1(c) is a rear view of a motor vehicle having an alternative configuration of the inventive impact sensor disposed thereon.
Figure 1D:
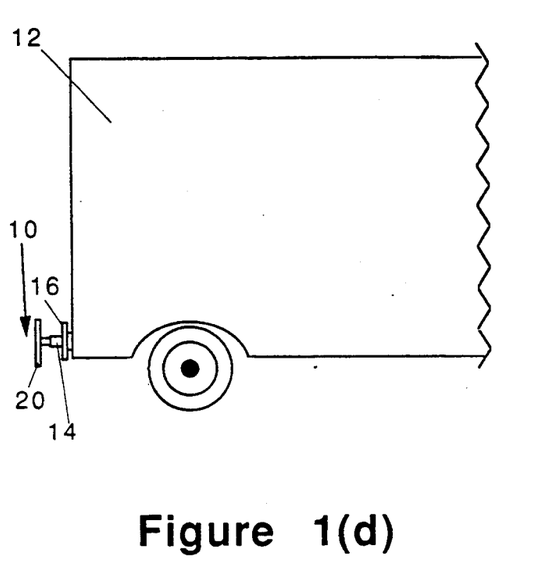
FIG. 1(d) is a cut-away side view of the motor vehicle shown in FIG. 1(a) having the preferred configuration of the inventive impact sensor disposed thereon.

Referring to FIG. 1(a) and FIG. 1(d) a rear view and cut-away side view of a motor vehicle having a preferred configuration of the inventive impact sensor 10 disposed thereon is shown mounted on a motor vehicle 12. In this case, the motor vehicle 12 is a truck, although, the vehicle may be a car, or another type of truck such as a gas truck, flat bed, or the like. It is contemplated that the inventive impact sensor 10 may be designed into the initial construction of the motor vehicle 12 or may be designed to be retrofitted to the motor vehicle 12 after production. In this embodiment, the inventive impact sensor 10 includes at least one sensing member 14 which is disposable on the motor vehicle 12. In this case, each sensing member 14 is attached to the pre-existing bumper of the motor vehicle 12 using, for example, bolts, screws, clamps, or other like attaching means. Also, when being retrofitted the sensing members 14 may be attached to the bumper 16 of the motor vehicle 12 using, for example, a mounting bracket which may be designed for each particular type of vehicle. As shown in FIG. 1, the inventive impact sensor 10 includes force transferring means 18 which may be comprised of a rigid member 20. This rigid member 20 may be constructed from a metal, plastic, wood, composite, or other suitable material. This rigid member 20 is effective for transferring a force of impact between the rigid member 20 and an obstacle to the sensing members 14. Furthermore, this rigid member 20 is supportable by the sensing members 14 and therefore always extends from the vehicle so that it is always available to detect an obstacle. This rigid member 20, as shown in FIG. 1, provides a relatively large zone of impact which may be sensed. This is because the rigid member 20 is effective for transferring the force of the impact to the sensing members 14. Therefore, it is not necessary that the sensing members 14 receive direct contact with the obstacle. If that was the case, then obstacles which were impacted at locations where the sensing members are not located, as in the prior art, would not be sensed and the effectiveness of the inventive impact sensor 10 would be greatly diminished.

Figure 1E:
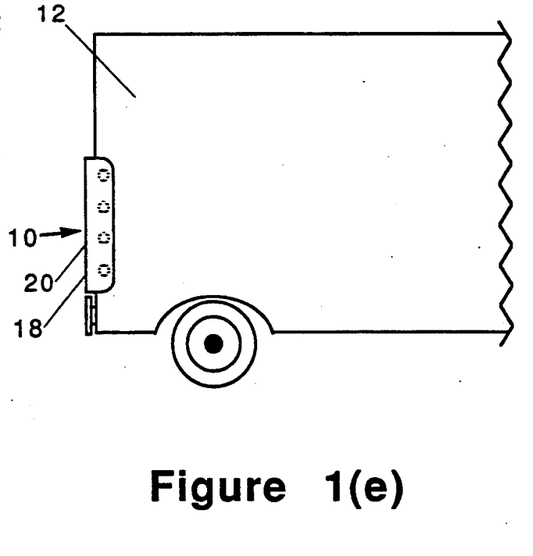
FIG. 1(e) is a cut-away side view of a motor vehicle shown in FIG. 1(c) having the alternative configuration of the inventive impact sensor disposed thereon.

FIG. 1(b) is a rear view of a gas truck 12 having the preferred configuration of the inventive impact sensor 10 disposed thereon is shown mounted on the motor vehicle 12. FIG. 1(c) is a rear view and FIG. 1(e) a side view of a truck 12 having an alternative configuration of the inventive impact sensor 10 disposed thereon. In this embodiment, a pair of rigid members 20 are positioned vertically along the sides of the rear of the truck 12. These rigid members 20 are supported by sensing members 14 as in other embodiments. Further, the rigid members 20 may extend around the corner of the truck 12 body to sense impact along the back sides of the truck 12.

Figure 2:
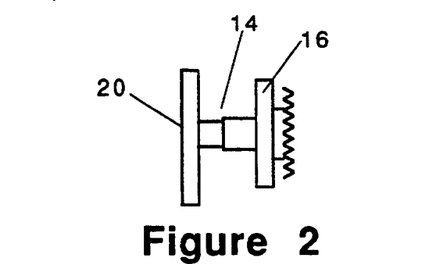
FIG. 2 is an isolated side plan view of the inventive impact sensor.

Referring to FIG. 2, an isolated view of the inventive impact sensor 10 is shown. The bumper 16 of the motor vehicle 12 supports the sensing member 14, which may be mounted as described above with reference to FIG. 1. The sensing members 14 further support the rigid member 20 so that the rigid member 20 extends from the vehicle. Thus, the rigid member 20 will contact with an obstacle prior to the vehicle contacting with the obstacle to thereby warn of the contact before damage is done to either the vehicle or obstacle.

Figure 3:
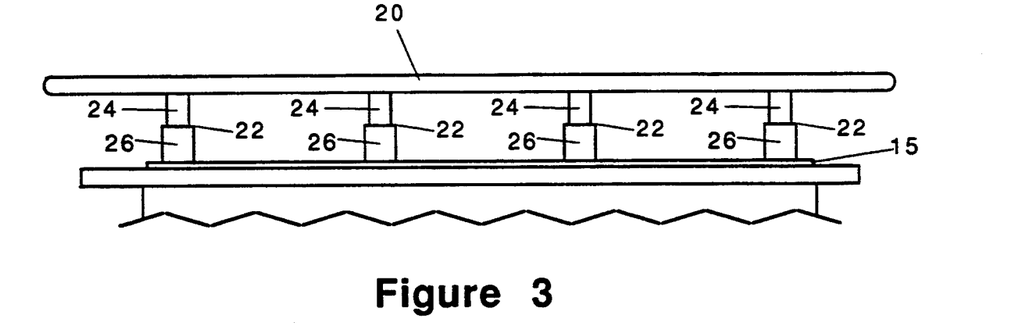
FIG. 3 is an isolated top plan view of the inventive impact sensor.

Referring to FIG. 3, a top plan view of the inventive impact sensor 10 is shown mounted on the bumper 16 of a truck. In this embodiment, the inventive impact sensor 10 includes four sensing members 14 which are disposed in spaced apart relationship on a mounting bracket 15. The mounting bracket 15 may be clamped, screwed, bolted, or otherwise attached to the bumper 16. Alternatively, the bumper 16 may be removed and the mounting bracket 15 may be attached directly to the vehicle. The sensing members 14 each include a telescoping support member 22 which is fixedly supported by the motor vehicle 12. The telescoping support members 22 have a first telescope member 24 and a second telescope member 26 and the first telescope member 24 is dimensioned and configured to slideably move relative to the second telescope member 26 in a telescoping manner in response to the force of impact transferred to the sensing member 14 through the rigid member 20 (described in detail below with reference to FIGS. 4(a) through 4(c)).

Figure 4A:
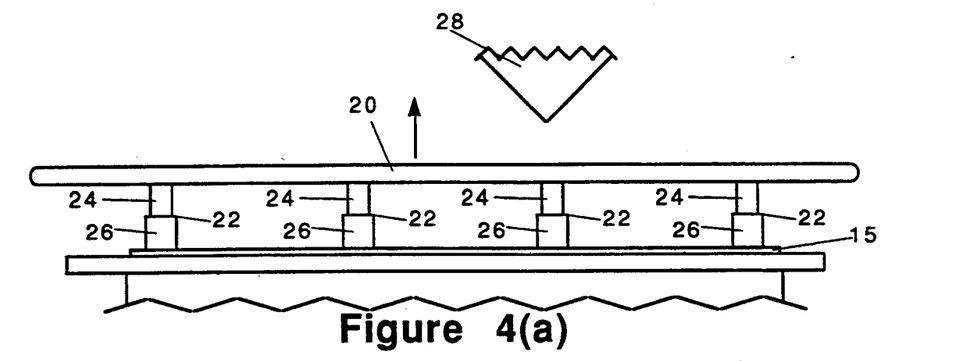
FIG. 4(a) is an isolated top plan view of the inventive impact sensor mounted on a vehicle and an obstacle just prior to contact with the obstacle.
Figure 4B:
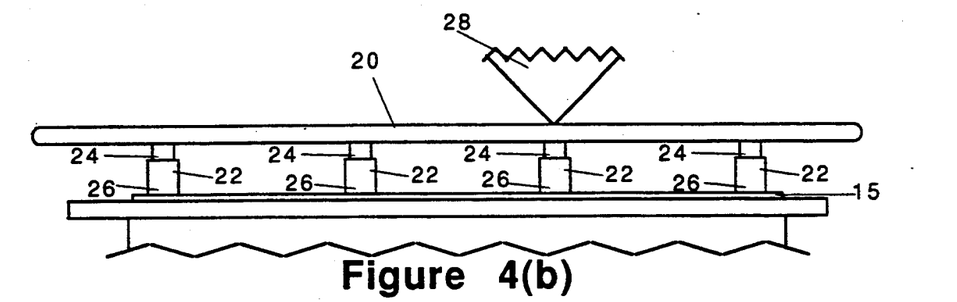
FIG. 4(b) is an isolated top plan view of the inventive impact sensor mounted on a vehicle at the point of contact with the obstacle.
Figure 4C:
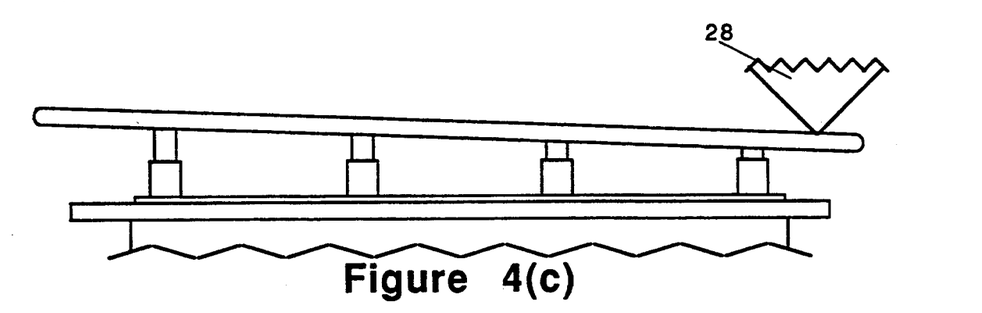
FIG. 4(c) is an isolated top plan view of the inventive impact sensor mounted on a vehicle showing contact with the obstacle and deflection of the rigid member.

Referring to FIGS. 4(a) through 4(c), a top plan view of the inventive impact sensor 10 is shown in use attached to a motor vehicle. As shown in FIG. 4(a), when the motor vehicle, such as a truck, is being backed up (in the direction of the arrow) it is often difficult for the driver of the vehicle to see an obstacle 28 in the vehicle's path. This is due to the fact, for example, that the obstacle 28 may be below the view afforded by any rear view mirror or rear view window in the vehicle if any exists, or the obstacle 28 may be hidden from view of the driver, even if side view mirrors are present, because the obstacle 28 is directly behind the vehicle and does not extend within view of the mirrors. In this case, the driver of the vehicle may continue backing up and as shown in FIG. 4(b) the obstacle 28 will contact first with the relatively large impact zone afforded by the rigid member 20. As shown in 4(b), the obstacle 28 may contact with the rigid member 20 at a location which is directly in front of any of the plurality of sensing members 14. However, as shown in FIG. 4(c), if the obstacle 28 contacts at a location not directly in front of one of the sensing members 14, then because of the force transferring nature of the rigid member 20, when the rigid member 20 is deflected by the obstacle 28, this deflection is transferred to at least one of the sensing members 14 causing it to collapse in the telescoping manner as shown. It is this deflection of the telescoping support members 22 which triggers the alarm waring the driver of the vehicle of the obstacle's 28 impact. This impact is sensed preferably, prior to any damage occurring to the obstacle 28 or vehicle. Also, because of the impact absorbing nature of the telescoping member, the force of impact is absorbed and cushioned further protecting both the obstacle 28 and the vehicle from damage.

Figure 5:
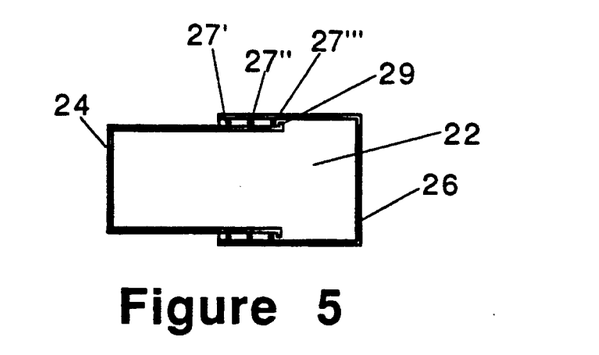
FIG. 5 is a cross-sectional view of the inventive telescoping support member.

FIG. 5 is a cross-sectional view Of the telescoping member. The telescoping support member 22 includes a first telescope member 24 and a second telescope member 26 wherein the first telescope member 24 is dimensioned and configured to slideably move relative to the second telescope member 26 in a telescoping manner in response to the force of impact transferred to the sensing member 14 through the rigid member 20. In the preferred embodiment, the first telescope member 24 is configured as a cylinder having a hollow interior and a flange 29. The second telescope member 26 is also configured as a cylinder having a hollow interior. To facilitate the sliding action of the first telescope member 24 within the second telescope member 26, an annular bearing 27' or bearings may be provided. Also, a seal 27" or seals may be provided to prevent the ingress of dust or dirt and further to provide a sealed, closed interior volume defined between the first telescope member 24 and the second telescope member 26. Also, a stop 27''' may be provided within the interior space of the second telescope which contacts with the flange 29 disposed on the first telescope member 24 to prevent the disengagement between the first telescope member 24 and the second telescope member 26.

Figure 6A:
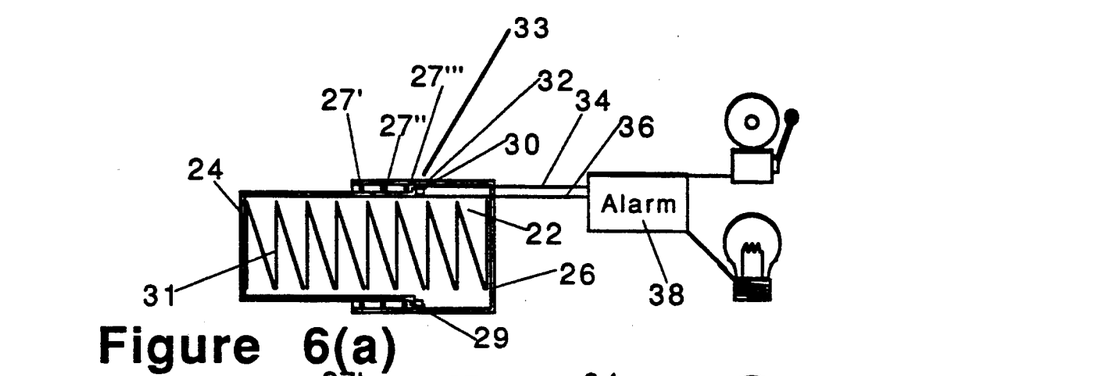
FIG. 6(a) is a cross-sectional view of a preferred embodiment of the sensing member of the inventive impact sensor and a schematic view of the alarm generating means.

As shown in FIG. 6(a), in a preferred embodiment, a spring 31 is disposed in the interior space defined by the first telescope member 24 and the second telescope member 26. This spring 31 contacts with the terminating walls of the first telescope member 24 and second telescope member 26 and is effective for urging the first telescope member 24 in an outwardly telescoping manner relative to the second telescope member 26. Thus, the spring 31 positions each telescope member so as to extend the rigid member 20 from the vehicle. The first telescope member 24 is prevented from being dislodged from the second telescope member 26 by the contact between the flange 29 and the stop 27'''. Each sensing member 14 also includes relative position sensing means 33 which may be disposed within the interior space. FIG. 6(e) is a cross-sectional view of the sensing member shown in FIG. 6(a) in a compressed state. The relative position sensing means 33 senses when the first telescope member 24 moves relative to the second telescope member 26 in the telescoping manner in response to the impact transferred to the sensing member 14 through the rigid member 20 and is effective to generate the signal in response thereto. In other words, when the relative positions of the first telescope member 24 and the second telescope member 26 change due to the deflection of the rigid member 20 (causing a compression of the telescoping support member 22) the relative position sensing means 33 detects this change in relative position which is effective to signal the alarm to warn the driver of the impact which causes the deflection.

In this embodiment, the relative position sensing means 33 includes a first contact 30 which is movable by the first telescope member 24. This first contact 30 may be an integral part of the flange 29 or other part of the first telescope member 24 or may be an additional element, such as an annular contact integrally attached to the flange 29. A second contact 32 is fixed to the second telescope member 26 so that when the first telescope member 24 moves relative to the second telescope member 26, the relative positions of the first contact 30 to the second contact 32 changes. The alarm generating means in this embodiment includes a signal generating circuit 38 including a first lead 34 which is electrically connected with the first contact 30 and a second lead 36 which is electrically connected with the second contact 32. When the first telescope member 24 moves relative to the second telescope member 26 in response to an impact with an obstacle 28, the signal generating circuit 38 is effective to generate the alarm dependent on the relative positions of the first contact 30 and the second contact 32. In other words, the compression of the telescoping support member 22 in response to the contact with the obstacle 28 changes the relative positions of the first contact 30 and the second contact 32 which causes the signal to be generated resulting finally in a warning signal being given to the driver of the vehicle that the impact has occurred.

The relative position sensing means 33 may be constructed of any of a variety of known position sensing constructions. For example, the relative position sensing means 33 may include a magnetic coupled detector. A magnetic coupled detector of known construction includes a first magnet (which comprises one of the first contact 30 or second contact 32) and either a second magnet or a metal member which comprises the other of the first contact 30 or the second contact 32. When the first contact 30 and the second contact 32 are moved relative to each other, in such a known detector, the movement of the magnetic lines generates a current which may be amplified and detected by the alarm generating circuit. Also, other magnetic effects may be detected using this construction with the result that when the relative positions of the contacts changes the alarm is generated to warn a driver of the motor vehicle of the contact with the obstacle. Thus, the alarm signal generating circuit 38 is effective for generating the alarm dependent on the relative positions. The alarm may be an audio alarm, such as a bell or buzzer, or may be a visual alarm, such as a light which is perceived by the driver to indicate that an impact with an obstacle 28 has occurred.

Figure 6B:
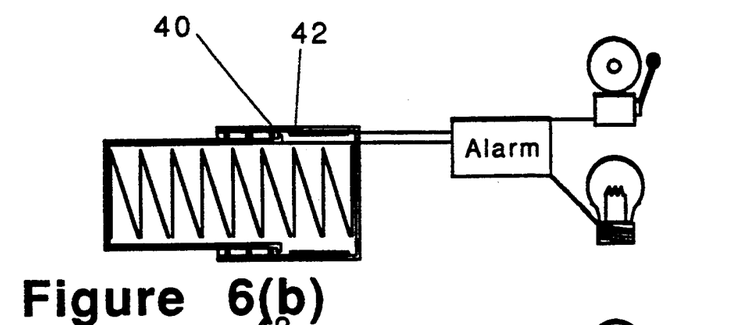
FIG. 6(b) is a cross-sectional view of another embodiment of the impact sensing member of the inventive impact sensor and schematic view of the alarm generating means.

Referring to FIG. 6(b), another embodiment of the sensing members 14 is shown. In this embodiment, the relative position sensing means 33 is comprised of an electrical coupling detector which includes a first electrical coupling 40 which comprises the first contact 30 and a second electrical coupling 42 which comprises the second contact 32. In this case, when the relative positions of the first telescope member 24 and the second telescope member 26 are changed due to the impact with an obstacle 28, the circuit of the signal generating circuit 38 is completed causing the alarm generating means to signal the alarm warning the driver of the impact. FIG. 6(f) is a cross-sectional view of the sensing member shown in FIG. 6(b) in a compressed state. The first electrical coupling 40 and the second electrical coupling 42 may be, for example, metal contacts which are not in contact during a no impact period and which come in contact when the telescoping support member 22 is compressed during the impact. Alternatively, the first electrical coupling 40 and the second electrical coupling 42 may be in contact during the period of no impact and may separate from contact during the period of impact in which case the signal generating circuit 38 detects the existence of the contact between the first electrical coupling 40 and the second electrical coupling 42 and recognizes that contact as a no impact situation and recognizes the condition of non-contact between the first electrical coupling 40 and the second electrical coupling 42 as a situation of impact with an obstacle 28.

Figure 6C:
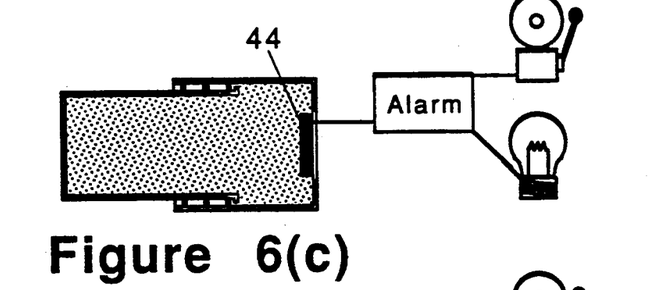
FIG. 6(c) is a cross-sectional view of yet another embodiment of the sensing member of the inventive impact sensor and schematic view of the alarm generating means.

Referring to FIG. 6(c), yet another alternative embodiment of the sensing members 14 is shown. In this embodiment, the interior space defined by the first telescope 24 member and the second telescope 26 member has a volume which is filled with a gas, such as air. FIG. 6(g) is a cross-sectional view of the sensing member shown in FIG. 6(c) in a compressed state. When the first telescope member 24 moves relative to the second telescope member 26 in response to an impact, the volume becomes smaller and the pressure of the gas becomes greater. The sensing member 14 also includes a pressure detector 44 of known construction, which detects a change in the pressure of the gas and is effective for generating the signal when a predetermined change in the pressure of the gas is detected. Thus, when an impact with an obstacle 28 occurs and the rigid member 20 causes the compression of one or more of the sensing members 14, this compression translates to an increase in the pressure of the gas disposed within the interior space which is detected by the pressure detector and is effective for the alarm generating means to generate the audio, visual, or other alarm which is perceived by the driver indicating that an impact has occurred.

Figure 6D:
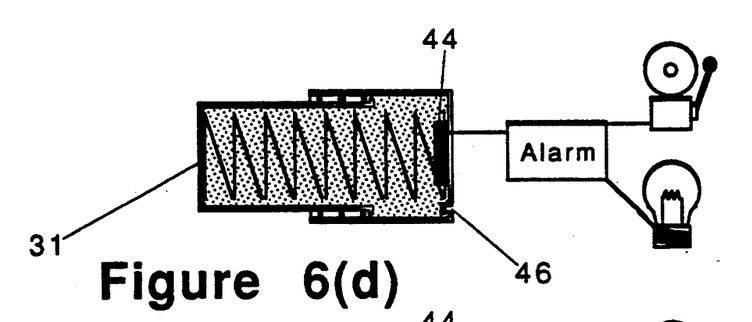
FIG. 6(d) is a cross-sectional view of still another embodiment of the impact sensing member of the inventive impact sensor and schematic view of the alarm generating means.
Figure 6E:
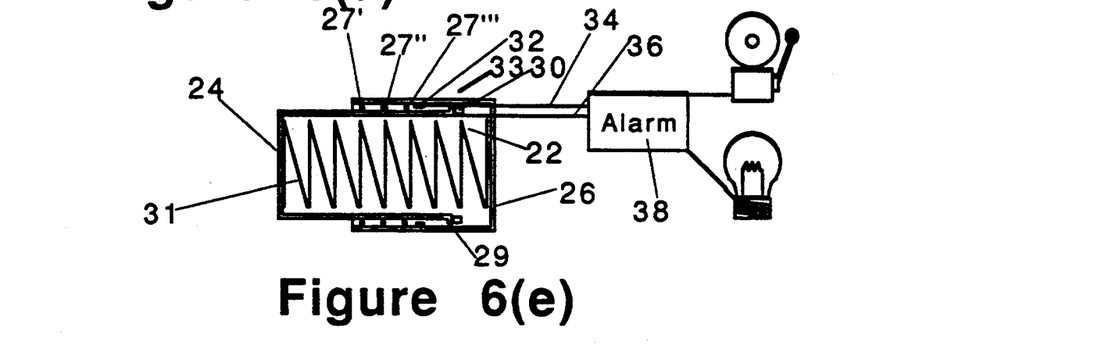
FIG. 6(e) is a crossed-sectional view of the sensing member shown in FIG. 6(a) in a compressed state.
Figure 6F:
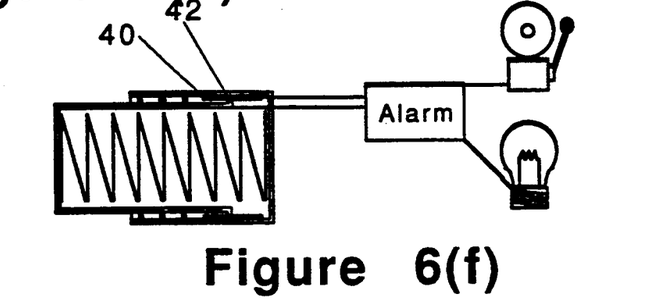
FIG. 6(f) is a cross-sectional view of the sensing member shown in FIG. 6(b) in a compressed state.
Figure 6G:
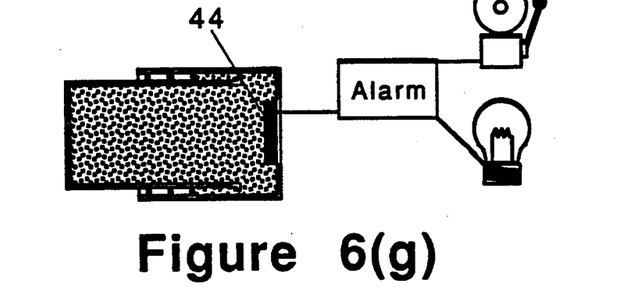
FIG. 6(g) is a cross-sectional view of the sensing member shown in FIG. 6(c) in a compressed state.
Figure 6H:
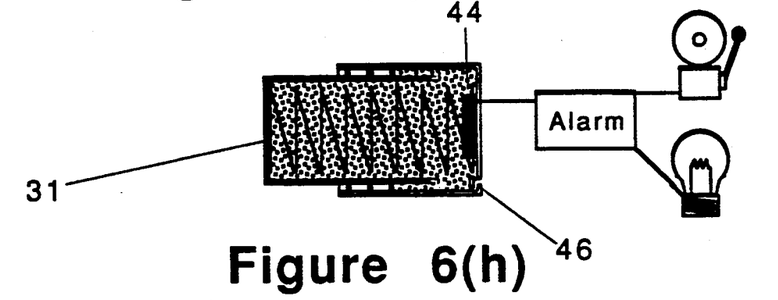
FIG. 6(h) is a cross-sectional view of the sensing member shown in FIG. 6(d) in a compressed state.

FIG. 6(d) shows still another embodiment of the sensing members 14. FIG. 6(h) is a cross-sectional view of the sensing member shown in FIG. 6(d) in a compressed state. In this embodiment, as with the embodiment shown in FIG. 6(c), the interior space defined by the first telescope member 24 and the second telescope member 26 is filled with a gas. Furthermore, a spring 31 is disposed within the interior space which is effective for urging the first telescope member 24 in an outwardly telescoping manner relative to the second telescope member 26 as described with reference to FIG. 6(a). In this embodiment, a one-way valve 46 may be provided which is effective for maintaining the gas disposed in the interior space at an ambient pressure during a period of no impact. In other words, during an impact and subsequent compression of the telescoping support member 22 the gas within the interior space will be placed under pressure greater than ambient pressure. In this case, some of the gas may leak out through the seal or may otherwise escape from the interior space. When the spring 31 urges the first telescope member 24 outward from the second telescope member 26 after the impact, the one-way valve 46 allows re-entry of gas into the interior space to thereby bring the interior space back to ambient pressure. Thus, the pressure detector may be under a consistent ambient pressure condition during no impact so as to be effective to detect when the pressure of the gas increases indicating an impact has occurred.

With respect to the above description, it is realized that the optimum dimensional relationships for parts of the invention, including variations in size, materials, shape, form, function, and manner of operation, assembly and use, are deemed readily apparent and obvious to one skilled in the art. All equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention.

We claim:

1. An impact sensor for a motor vehicle, comprising: at least two sensing members disposable in spaced apart relation on a motor vehicle and effective for sensing an impact with an obstacle and generating a signal in response thereto, each sensing member comprising a telescoping support member normally biased in an extended alarm-ready position, the telescoping support member having a first telescope member and a second telescope member defining an interior space having a volume, the first telescope member being dimensioned and configured to slideably move relative to the second telescope member in a telescoping manner so that the telescoping support member contracts from the extended alarm-ready position to a contracted alarm-generate position in response to a force of impact, each sensing member also comprising relative position sensing means for sensing when the first telescope member moves relative to the second telescope member in a telescoping manner and generating the signal when the telescoping support member contracts to the alarm-generate position each said sensing member further comprising a gas disposed in the interior space so that when the first telescope member moves relative to the second telescope member in response to an impact, the volume becomes smaller and a pressure of the gas becomes greater; force transferring means comprising a rigid member supportable by the spaced apart sensing members so that a deflection of the rigid member caused by the force of impact between the rigid member and the obstacle is transferred to at least one sensing member so that upon contact with the obstacle the rigid member deflects and causes at least one of the telescoping support members to contract to the alarm-generate position; urging means associated with each sensing member for constantly urging the first telescope member in an outwardly telescoping manner relative to the second telescope member so that the rigid member is always disposed at a position relative to the motor vehicle effective to cause at least one of the telescoping support members to contract to the alarm-generate position upon contact between the obstacle and the rigid member, the urging means also for returning the telescoping support member to the extended alarm-ready position when there is no contact with the obstacle; a spring disposed in the interior space effective for urging the first telescope member in an outwardly telescoping manner relative to the second telescope; a one-way valve in communication with the interior space and effective for maintaining the gas at an ambient pressure during a period of no-impact; and alarm generating means receptive of the signal for generating an alarm in response thereto to warn a driver of the motor vehicle of the contact with the obstacle, the alarm generating means including a pressure detector for detecting a change in the pressure of the gas and being effective for generating an alarm when a predetermined change in the pressure of the gas is detected.

2. An impact sensor for a motor vehicle according to claim 1 wherein the relative position sensing means comprises a first contact movable by the first telescope member and a second contact fixed to the second telescope member; and the alarm generating means includes a signal generating circuit including a first lead electrically connected with the first contact and a second lead electrically connected with the second contact so that when the first telescope member moves relative to the second telescope member in response to an impact, the signal generating circuit generates the alarm dependent on the relative positions of the first contact and the second contact.

3. An impact sensor for a motor vehicle according to claim 2 wherein the relative position sensor comprises a magnetic coupled detector including a first magnet comprising either of the first contact and the second contact, and either of a magnet or metal member comprising the other of the first contact and the second contact.

4. An impact sensor for a motor vehicle according to claim 2 wherein the relative position sensor comprises an electrical coupling detector including a first electrical coupling comprising the first contact and a second electrical coupling comprising the second contact.

5. An impact sensor for a motor vehicle according to claim 1 wherein the alarm generating means include means for generating at least one of an audible alarm and a visual alarm to warn the driver upon contact between the rigid member and the obstacle.

6. An impact sensor for a motor vehicle according to claim 1 further comprising mounting means for mounting the sensing members effective to dispose the impact sensor on a bumper of the motor vehicle.

7. An impact sensor for a motor vehicle according to claim 1 further comprising mounting means for mounting the sensing members effective to dispose the impact sensor on a side of the motor vehicle.

8. An impact sensor for a motor vehicle according to claim 1 further comprising mounting means for mounting the sensing members effective to dispose the impact sensor vertically along a side of the rear of the motor vehicle.

9. An impact sensor for a motor vehicle according to claim 8 wherein the rigid member is curved so as to extend around the corner of the rear of the motor vehicle; and the mounting means includes means for mounting the sensing members effective to dispose the impact sensor so as to extend around the corner of the rear of the motor vehicle.

10. An impact sensor for a motor vehicle, comprising: at least one sensing member including a telescoping support member fixedly supportable by a motor vehicle and normally biased in an extended alarm-ready position, the telescoping support member having a first telescope member and a second telescope member, the first telescope member and the second telescope member defining an interior space having a volume, the first telescope member being dimensioned and configured to slideably move relative to the second telescope member in a telescoping manner in response to a force of impact with an obstacle so that the telescoping support member contracts from the extended alarm-ready position to a contracted alarm-generate position in response to the force of impact, each sensing member having relative position sensing means for sensing when the first telescope member moves relative to the second telescope member in a telescoping manner and for generating a signal when the telescoping support member contracts to the alarm-generate position, each sensing member further comprising a gas disposed in the interior space so that when the first telescope member moves relative to the second telescope member in response to an impact, the volume becomes smaller and a pressure of the gas becomes greater; urging means comprising a spring disposed in the interior space effective for urging the first telescope member in an outwardly telescoping manner relative to the second telescope and associated with each sensing member for constantly urging the first telescope member in an outwardly telescoping manner relative to the second telescope member so that the telescoping support member is always disposed at a position relative to the motor vehicle effective to contract to the alarm-generate position upon contact between the obstacle and the sensing member, the urging means also for returning the telescoping support member to the extended alarm-ready position when there is no contact with the obstacle; alarm generating means receptive of the signal for generating an alarm in response thereto to warn a driver of the motor vehicle of the contact with the obstacle; a pressure detector for detecting a change in the pressure of the gas and effective for generating the signal when a predetermined change in the pressure of the gas is detected; and a one-way valve in communication with the interior space and effective for maintaining the gas at an ambient pressure during a period of no-impact.

11. An impact sensor for a motor vehicle according to claim 10 wherein each sensing member comprises relative position sensing means for sensing when the first telescope member moves relative to the second telescope member in a telescoping manner in response to the impact transferred to the sensing member through the rigid member.

12. An impact sensor for a motor vehicle according to claim 11 wherein the relative position sensing means comprises a first contact movable by the first telescope member and a second contact fixed to the second telescope member and the alarm generating means includes a signal generating circuit including a first lead electrically connected with the first contact and a second lead electrically connected with the second contact so that when the first telescope member moves relative to the second telescope member in response to an impact, the signal generating circuit is effective to generate the alarm dependent on the relative positions of the first contact and the second contact.

13. An impact sensor for a motor vehicle according to claim 10 further comprising mounting means for mounting the sensing members effective to dispose the impact sensor on a bumper of the motor vehicle.

14. An impact sensor for a motor vehicle according to claim 10 further comprising mounting means for mounting the sensing members effective to dispose the impact sensor on a side of the motor vehicle.

15. An impact sensor for a motor vehicle, comprising: at least two sensing members disposable in spaced apart relation on a motor vehicle and effective for sensing an impact with an obstacle and generating a signal in response thereto, each sensing member comprising a telescoping support member normally biased in an extended alarm-ready position, the telescoping support member having a first telescope member and a second telescope member defining an interior space, the first telescope member being dimensioned and configured to slideably move relative to the second telescope member in a telescoping manner so that the telescoping support member contracts from the extended alarm-ready position to a contracted alarm-generate position in response to a force of impact, each sensing member also comprising relative position sensing means for sensing when the first telescope member moves relative to the second telescope member in a telescoping manner and generating the signal when the telescoping support member contracts to the alarm-generate position; force transferring means comprising a rigid member curved so as to extend around the corner of the rear of the motor vehicle and supportable by the spaced apart sensing members so that a deflection of the rigid member caused by the force of impact between the rigid member and the obstacle is transferred to at least one sensing member so that upon contact with the obstacle the rigid member deflects and causes at least one of the telescoping support members to contract to the alarm-generate position; urging means associated with each sensing member for constantly urging the first telescope member in an outwardly telescoping manner relative to the second telescope member so that the rigid member is always disposed at a position relative to the motor vehicle effective to cause at least one of the telescoping support members to contract to the alarm-generate position upon contact between the obstacle and the rigid member, the urging means also for returning the telescoping support member to the extended alarm-ready position when there is no contact with the obstacle; and alarm generating means receptive of the signal for generating an alarm in response thereto to warn a driver of the motor vehicle of the contact with the obstacle; mounting means for mounting the sensing members effective to dispose the impact sensor vertically along a side of the rear of the motor vehicle and so as to extend around the corner of the rear of the motor vehicle.

* * * * *